United States Patent [19]

Kaule

[11] 4,313,092
[45] Jan. 26, 1982

[54] LASER APPARATUS WITH LAMP CHANGE MEANS

[75] Inventor: Walter Kaule, Cologne, Fed. Rep. of Germany

[73] Assignee: Krautkramer-Branson, Inc., Stratford, Conn.

[21] Appl. No.: 123,371

[22] Filed: Feb. 21, 1980

[30] Foreign Application Priority Data

Mar. 8, 1979 [DE] Fed. Rep. of Germany ....... 2909173

[51] Int. Cl.³ .............................................. H01S 3/093
[52] U.S. Cl. ................................................. 331/94.5 P
[58] Field of Search ..................... 331/94.5 C, 94.5 D, 331/94.5 P

[56] References Cited

U.S. PATENT DOCUMENTS

| | | | |
|---|---|---|---|
| 2,557,531 | 6/1951 | Blanchet . | |
| 3,311,844 | 3/1967 | DiCurcio | 331/94.5 P |
| 3,646,471 | 2/1972 | DeMent | 331/94.5 P |

FOREIGN PATENT DOCUMENTS 273184  4/1914  Fed. Rep. of Germany .
2312943 9/1973  Fed. Rep. of Germany .
1097127 12/1967 United Kingdom .

*Primary Examiner*—William L. Sikes
*Attorney, Agent, or Firm*—Ervin B. Steinberg; Philip J. Feig

[57] ABSTRACT

An apparatus for pumping a laser by a source of light comprises a movable housing having a plurality of cavities each containing a respective light source for pumping the laser and a laser contained in a cavity of a stationary housing. The cavity of the stationary housing forms with a respective complementary cavity of the movable housing a cylindrical pumping chamber. Responsive to the failure of a lamp, the movable housing is indexed to bring a new lamp into operative relation with the laser.

6 Claims, 4 Drawing Figures

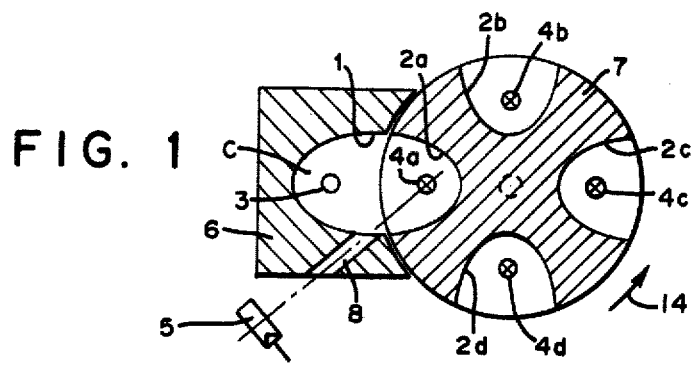
FIG. 1
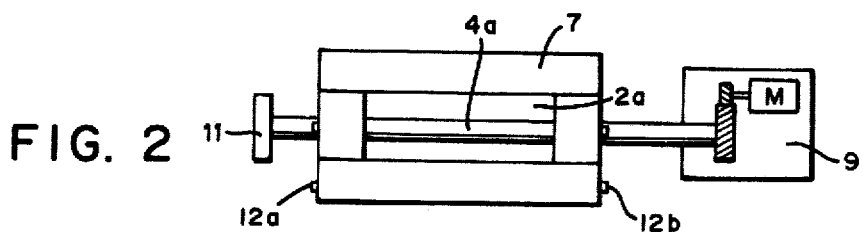
FIG. 2
FIG. 3
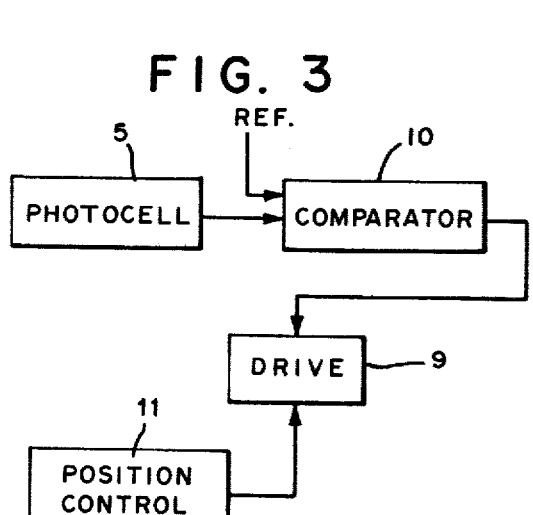
FIG. 4
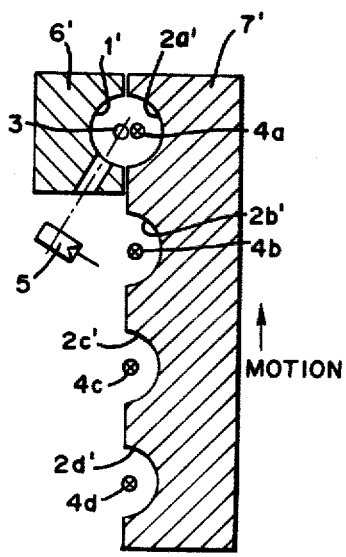

LASER APPARATUS WITH LAMP CHANGE MEANS

BRIEF SUMMARY OF THE INVENTION

This invention refers to a laser apparatus which comprises a stationary elongated laser source and an elongated light pumping means, both in a cylindrically shaped reflective chamber, with means to rapidly replace the light pumping means.

Laser sources, particularly solid state lasers, are pumped optically. Light of a suitable frequency is fed as excitation energy to the laser. When a high power laser is pumped, flash devices in the form of gas discharge lamps are used to provide such energy. Since such flash lamps are filamentary devices and since the laser is of elongated form, it is desirable to optically couple both to each other by locating the lamp and the laser within an eliptical cylindrical chamber at the location of the respective focal lines. The chamber is known as a mirror chamber or pump chamber. Depending upon the operating conditions, the lamps have a limited operating life and, moreover, after a certain time of operation, the light output from a lamp decreases. In addition to the natural aging of a lamp, sudden failure occurs as caused, for instance, by glass envelope breakage or similar sudden defects.

With presently known devices, the replacement of a lamp causes an annoying interruption of the laser operation. In order to exchange a lamp, the laser must be switched off and together with manual procedures required to replace the lamp in the chamber, the interruption may last ten minutes or longer.

If a laser source is used in production, the interruption of service for replacing a lamp causes undue delays and increased production costs. Obviously, given the present state of the art, such interruptions are unavoidable and have been accepted as a necessary fact of life. In order to overcome such interruptions, particularly those caused by aging of the lamp, it is possible to exchange lamps after a certain number of operating hours during scheduled shutdowns of production. In the latter case full advantage is not taken of the actual useful service life of a lamp and replacement costs are unnecessarily increased. While signal devices are known which indicate a decrease of the light output of the lamp in use, such devices do not overcome the need for a shutdown of operations for the sole purpose of replacing a lamp.

The present invention overcomes the heretofore existing problem and instead provides for an arrangement in which automated replacement of a lamp is accomplished. Such automatic changing to a new lamp is done fully automatically when a lamp fails or when the desired output of the lamp in use falls below a predetermined output level. Switching from one lamp to another lamp is done in a minimum of time, usually a few seconds, and is accomplished without human intervention.

One of the principal objects of this invention is, therefore, a laser arrangement in which lamp failure no longer causes lengthy interruption of service, but is accomplished quickly and in an automatic manner.

Other and still further objects of this invention will be more clearly apparent from the following description when taken in conjunction with the accompanying drawings.

BRIEF DESCRIPTION OF THE DRAWINGS

FIG. 1 is a cross-sectional view of a first embodiment of the invention;

FIG. 2 is a side view of FIG. 1 with the stationary housing removed;

FIG. 3 is a schematic block diagram, and

FIG. 4 is a cross-sectional view of a second embodiment of the invention.

DETAILED DESCRIPTION OF THE INVENTION

With reference to FIG. 1, the cylindrical mirror chamber C of elliptical cross-section comprising complementary cavities 1 and 2a houses a rod-shaped elongated laser source 3 located substantially at one of the focal lines of the ellipse and a flash lamp 4a, particularly its discharge path, disposed substantially at the second and opposite focal line of the ellipse. The cavity 1 is disposed in a stationary housing 6 which supports the laser source 3, whereas the complementary chamber 2a is disposed in a rotatable cylindrical housing 7 which supports the lamp 4a and which contains additional identical cavities 2b, 2c and 2d, each of which contains at its respective focal lines a flash lamp 4b, 4c, or 4d. Operation of a flash lamp disposed opposite the laser medium 3 is sensed by a photoelectric cell 5 which communicates with the flash lamp via a bore 8 in the housing 6. In the event of a failure of the flash lamp opposite the laser 3, or if the appropriate light level is not reached by the flash lamp, the housing 7 is rotated as indicated by the arrow 14 and is indexed by one cavity to form a chamber which brings the next flash lamp into operating position opposite the laser 3. When such rotation occurs, the no longer operative flash lamp during rotation automatically is removed from the source of voltage (not shown) and as the next flash lamp is moved into its operative position opposite the laser 3, it automatically becomes connected to the source of voltage.

The drive mechanism for the housing 7 is illustrated schematically in FIG. 2. With reference also to FIG. 3, the electrical signal provided by the photocell 5 is compared with a predetermined reference signal supplied to the comparator 10. If the signal provided by the photocell 5 fails to attain the desired amplitude, the drive mechanism 9 is actuated, rotating the housing 7 (the magazine) until a position control device 11 provides a stop signal to the motor M of the drive mechanism 9. Indexing mechanisms of this type are commercially available and do not need to be described in detail. If desired, a cooling medium can be fed through the housing 7 by means of a bore in the rotating shaft to the chamber C. Electrical contact with the operating flash lamp is provided by means of contacts 12a and 12b, using a sliding contact arrangement. The position control 11 is not described in detail as there are numerous arrangements in commercial use, such as a mechanical scanning device, optical position indicators, electrical limit switches, etc. The servo motor M forming a part of the driving mechanism preferrably is a low voltage motor and drives the shaft of the cylindrical housing 7 by suitable gearing. The indexing of the lamps requires the interruption of the laser device by only a few seconds. Depending upon the number of semi-cylindrical cavities disposed in the movable housing 7, moving a new lamp into the operative position can be programmed to occur at a specific time or after a predetermined quantity of flashes has occurred prior to the statistical end of the life of a lamp.

It is possible to exchange a complete housing or magazine 7 so as to overcome the need for changing or replacing burned out lamps while the rotatable housing is in use.

FIG. 4 shows a modification of the arrangement disclosed in FIGS. 1 and 2. In this illustration the flash lamps are arranged in parallel rows and the indexing of flash lamps is done by a sliding or linear motion of the housing 7' against stationary housing 6'. The cavity 1' is of semi-cylindrical shape with circular cross-section and cavities 2b', 2c' and 2d' are semi-cylindrical grooves with circular cross-section. Obviously, cavities of circular cross-section are more easily machined. Since in a chamber with circular cross-section there is only one focal point and focal line, the laser 3 and the flash lamps, such as lamp 4a, should be spaced very close to one another in order to provide a high degree of optical coupling.

The arrangements described hereinabove make it possible to change lamps outside the mirror chamber and without interrupting the operation of a laser device. Moreover, it is possible to take advantage of the full service life of a particular lamp and provide for a fully automatic replacement of a lamp without the usual service interruption and the requirement for operator attention.

As used in the claims hereafter, the term "substantially semi-cylindrical" shall mean that the cavity is of generally semi-cylindrical shape, but may be larger or smaller than a true semi-cylinder.

What is claimed is:

1. A laser apparatus including means for automatically changing the light source used for pumping the laser comprising:

a stationary housing having a substantially semi-cylindrical cavity;

a movable housing having a plurality of substantially semi-cylindrical cavities;

said stationary housing and said movable housing being so positioned that said cavity of said stationary housing and a cavity of said movable housing when indexed opposite the cavity of said stationary housing form complementary halves of a substantially cylindrical chamber;

an elongated laser source disposed in said cavity of said stationary housing substantially at the position of the focal line of said chamber;

a pumping light source disposed in said cavities of said movable housing substantially at the position of the focal line of said chamber, and means for moving said cavities of said movable housing sequentially into indexed position opposite said cavity of said stationary housing to form said chamber with said laser source and a respective light source optically coupled to each other.

2. A laser apparatus as set forth in claim 1, said cavities being shaped to cause said chamber to be of elliptical cross-section.

3. A laser apparatus as set forth in claim 1, said cavities being shaped to cause said chamber to be of circular cross-section.

4. A laser apparatus as set forth in claim 1, said movable housing being a cylinder with associated cavities disposed about the circumference of the cylinder, and means for rotatably indexing said cylinder.

5. A laser apparatus set forth in claim 1, said movable housing having parallel grooves for forming the respective cavities, and means for moving said housing in a linear motion for moving the cavities of said movable housing into indexed position.

6. A laser apparatus as set forth in claim 1, and sensing means disposed for sensing the output of the light source disposed in said chamber and causing operation of said means for moving said housing responsive to said light source being below a predetermined output level.

* * * * *